(12) United States Patent
Wasson (10) Patent No.: US 8,539,766 B2
(45) Date of Patent: Sep. 24, 2013

(54) MASTER CYLINDER WITH FLOW GROOVE

(75) Inventor: Andrew Paul Wasson, Wooster, OH (US)

(73) Assignee: Robert Bosch GmbH, Stuttgart (DE)

( * ) Notice: Subject to any disclaimer, the term of this patent is extended or adjusted under 35 U.S.C. 154(b) by 736 days.

(21) Appl. No.: 12/819,633

(22) Filed: Jun. 21, 2010

(65) Prior Publication Data

US 2011/0308247 A1 Dec. 22, 2011

(51) Int. Cl.
*F15B 7/08* (2006.01)

(52) U.S. Cl.
USPC ............................................. 60/588

(58) Field of Classification Search
USPC .................... 60/585, 588, 589, 591
See application file for complete search history.

(56) References Cited

U.S. PATENT DOCUMENTS

| | | | | |
|---|---|---|---|---|
| 4,510,753 A | * | 4/1985 | Steer | ............................... 60/588 |
| 4,685,301 A | | 8/1987 | Bacardit et al. | |
| 4,718,234 A | | 1/1988 | Steer | |
| 5,154,107 A | * | 10/1992 | Morin et al. | .................... 60/588 |
| 5,878,575 A | | 3/1999 | Kreh et al. | |
| 6,402,263 B1 | | 6/2002 | Wasson | |
| 6,651,429 B2 | * | 11/2003 | Ishiwata et al. | ................. 60/588 |
| 7,104,059 B2 | | 9/2006 | Tsubouchi et al. | |

FOREIGN PATENT DOCUMENTS

| | | |
|---|---|---|
| GB | 1254089 A | 11/1971 |
| GB | 2121901 A | 1/1984 |

OTHER PUBLICATIONS

International Search Report and Written Opinion in corresponding PCT Application (i.e., PCT/US2011/040636), completed Feb. 23, 2012, 9 pages.

* cited by examiner

*Primary Examiner* — Michael Leslie
(74) *Attorney, Agent, or Firm* — Maginot, Moore & Beck (57) ABSTRACT

A master cylinder includes a cylinder bore, a first piston positioned within the cylinder bore, a second piston positioned within the bore and located forwardly of the first piston, a first pressure chamber within the cylinder bore and defined in part by a rear portion of the second piston and a forward portion of the first piston, a first pressure chamber seal extending radially outwardly from the rear portion of the second piston, a first reservoir inlet configured to provide fluid communication between a reservoir and the cylinder bore at a location forwardly of the first pressure chamber seal, and a first groove extending axially along the cylinder bore and positioned such that (i) when the second piston is in a released position, the first groove is located directly outwardly of the first pressure chamber seal and the reservoir is in fluid communication with the first pressure chamber through the first groove, and (ii) when the second piston is in an activated position, the first pressure chamber seal isolates the reservoir from the first pressure chamber at a location forwardly of the first groove.

13 Claims, 6 Drawing Sheets

MASTER CYLINDER WITH FLOW GROOVE

FIELD

The invention relates to braking systems, and in particular to a fast-fill master cylinder.

BACKGROUND

A braking system typically includes a master cylinder which is fluidly coupled to downstream braking circuits. During an initial period of actuation, the master cylinder generates fluid pressure in downstream braking circuits and displaces fluid in order to place friction members of the braking system, e.g., brake pads, against complementary surfaces, e.g., a rotor or a drum. In certain circumstances, brake pads may be displaced away from the rotor, thereby generating a gap between the brake pads and the rotor. When fully actuated, the brake pads are in contact with the rotor, and thereafter the brake pads perform the desired braking function. When actuation is first initiated, however, the brake pads are not in physical contact with the rotor. This lack of physical contact results in minimal pressure buildup in the downstream braking circuits, which results in lack of braking. In addition to the lack of braking, an operator of the vehicle may receive a different pedal feedback when the actuation is first initiated as compared to the pedal feedback the operator receives once the brake pads are in contact with the rotor. This difference in the pedal feedback can be unsettling to the operator.

One way to shorten the lack of braking and reduce the unsettling difference in the pedal feedback when the actuation is first initiated is to include a check valve, which allows a fast refill of the downstream braking circuits from a reservoir followed by isolating the braking circuits from the reservoir. The check valve, however, adds cost and may be unreliable in a harsh environment associated with typical braking systems.

Therefore, it is highly desirable to provide a master cylinder construction which can minimize the lack of braking and reduce the unsettling difference in the pedal feedback when the actuation is first initiated by rapidly increasing pressure in the downstream braking circuits.

SUMMARY

According to one embodiment of the present disclosure, there is provided a master cylinder. The master cylinder includes a cylinder bore, a first piston positioned within the cylinder bore, a second piston positioned within the bore and located forwardly of the first piston, a first pressure chamber within the cylinder bore and defined in part by a rear portion of the second piston and a forward portion of the first piston, a first pressure chamber seal extending radially outwardly from the rear portion of the second piston, a first reservoir inlet configured to provide fluid communication between a reservoir and the cylinder bore at a location forwardly of the first pressure chamber seal, and a first groove extending axially along the cylinder bore and positioned such that (i) when the second piston is in a released position, the first groove is located directly outwardly of the first pressure chamber seal and the reservoir is in fluid communication with the first pressure chamber through the first groove, and (ii) when the second piston is in an activated position, the first pressure chamber seal isolates the reservoir from the first pressure chamber at a location forwardly of the first groove.

According to one embodiment of the present disclosure, there is provided a braking system. The braking system includes a master cylinder including an inner wall defining a portion of a bore, a primary piston positioned within the bore, a secondary piston positioned within the bore and located forwardly of the primary piston, a primary pressure chamber within the bore and defined in part by a rear portion of the secondary piston and a forward portion of the primary piston, a secondary pressure chamber within the bore and defined in part by a forward portion of the secondary piston, a first seal extending radially outwardly from the second piston, the first seal isolating the secondary pressure chamber from a low pressure secondary area, a second seal extending radially outwardly from the second piston, the second seal positioned between the low pressure secondary area and the primary pressure chamber, a reservoir in fluid communication with the low pressure secondary area, and a first groove extending axially along the bore and positioned such that (i) when the secondary piston is in a released position, the first groove is located directly outwardly of the second seal and the reservoir is in fluid communication with the primary pressure chamber through the first groove, and (ii) when the secondary piston is in an activated position, the second seal sealingly engages the inner wall to isolate the reservoir from the primary pressure chamber.

DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

Figure 1:
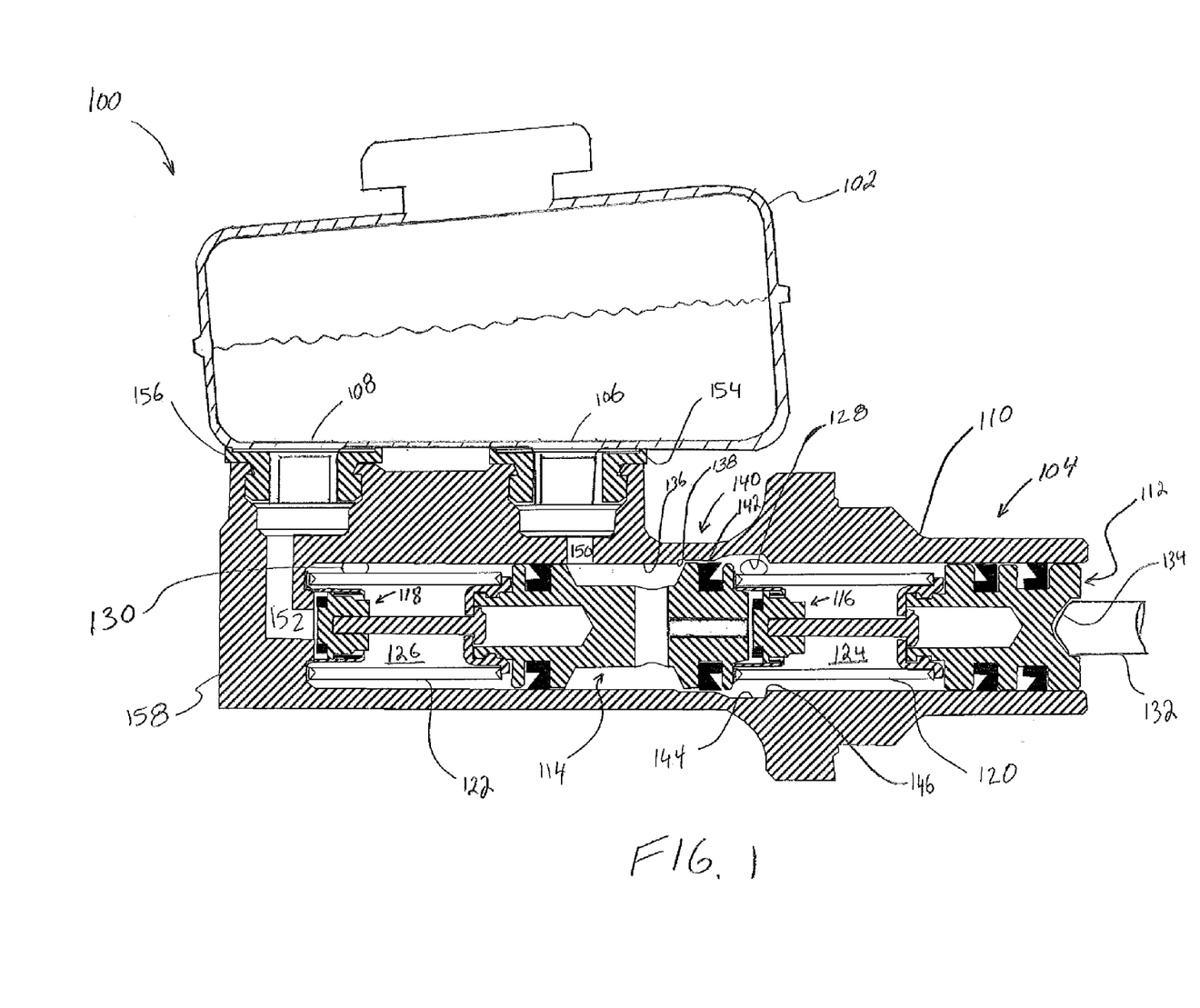
FIG. 1 depicts a fragmentary cross sectional view of a braking system including a reservoir and master cylinder assembly, shown in a released position.

Referring to FIG. 1, a fragmentary cross sectional view of a braking system 100 is depicted. The braking system 100 includes a reservoir 102 and a master cylinder assembly 104. The reservoir 102 is fluidly coupled to the master cylinder assembly 104.

The reservoir 102 includes two outlets 106 and 108 for communicating fluid within the reservoir 102 to the master cylinder assembly 104. Generally, fluid within the reservoir 102 is under low pressure as compared to fluid within the master cylinder assembly 104 during braking operations. The reservoir 102 includes a sensor (not shown) to provide a signal to an electronic control unit (ECU) (not shown) corresponding to the fluid level within the reservoir 102.

The master cylinder assembly 104 includes a cylinder 110, a first piston assembly 112, a second piston assembly 114, a first poppet assembly 116, a second poppet assembly 118, a first spring 120, and a second spring 122. The first poppet assembly 116 is disposed between the first piston assembly 112 and the second piston assembly 114. The second poppet assembly 118 is disposed between the second piston assembly 114 and an end 158 of the cylinder 110. The first piston assembly 112 is coupled to and biased away from the second piston assembly 114 by the first spring 120. The second piston assembly 114 is biased away from the end 158 of the cylinder 110 by the second spring 122. The first piston assembly 112, the second piston assembly 114, and the cylinder 110 define a first pressure chamber 124. The second piston assembly 114 and the end 158 of the cylinder 110 define a second pressure chamber 126. The first pressure chamber 124 is in fluid communication with a first downstream circuit (not shown) via a first outlet 128. The second pressure chamber 126 is in fluid communication with a second downstream circuit (not shown) via a second outlet 130. Also depicted in FIG. 1 is an input rod 132 which is coupled to a brake pedal (not shown). The input rod 132 is coupled to the first piston assembly 112 with a ball-and-socket interface 134.

The cylinder 110 includes a bore 136. The bore 136 provides a generally continuous inside diameter that interfaces with the first and second piston assemblies 112 and 114. A discontinuity 138, however, is provided in the bore which defines a beginning of a groove 140. The groove 140 may be an axial groove or a radial groove, or a combination of axial and radial grooves. The groove 140 generally includes a first portion 142 and a second portion 144, and is terminated at a second discontinuity 146 in the bore 136. The first portion 142 defines a diameter slightly larger than the diameter of the bore 136. The second portion 144 defines a diameter larger than the first portion 142. Therefore, the first portion 142 provides a transition between the second portion 144 and the bore 136. The groove 140 is formed about the first outlet 128, which is in fluid communication with the first downstream braking circuit (not shown), and extends in a forward direction from the first portion 142 to the first outlet 128.

The cylinder 110 also defines reservoir inlets 150 and 152 in fluid communication with fittings 154 and 156, respectively. The fittings 154 and 156 couple to complementary fittings corresponding to the outlets 106 and 108, respectively. The reservoir inlet 150 is configured to establish fluid communication between the reservoir 102 and the first pressure chamber 124 through the second piston assembly 114 when the second piston assembly 114 and the first poppet assembly 116 are in the position as depicted in FIG. 1, as described more fully below.

Figure 2:
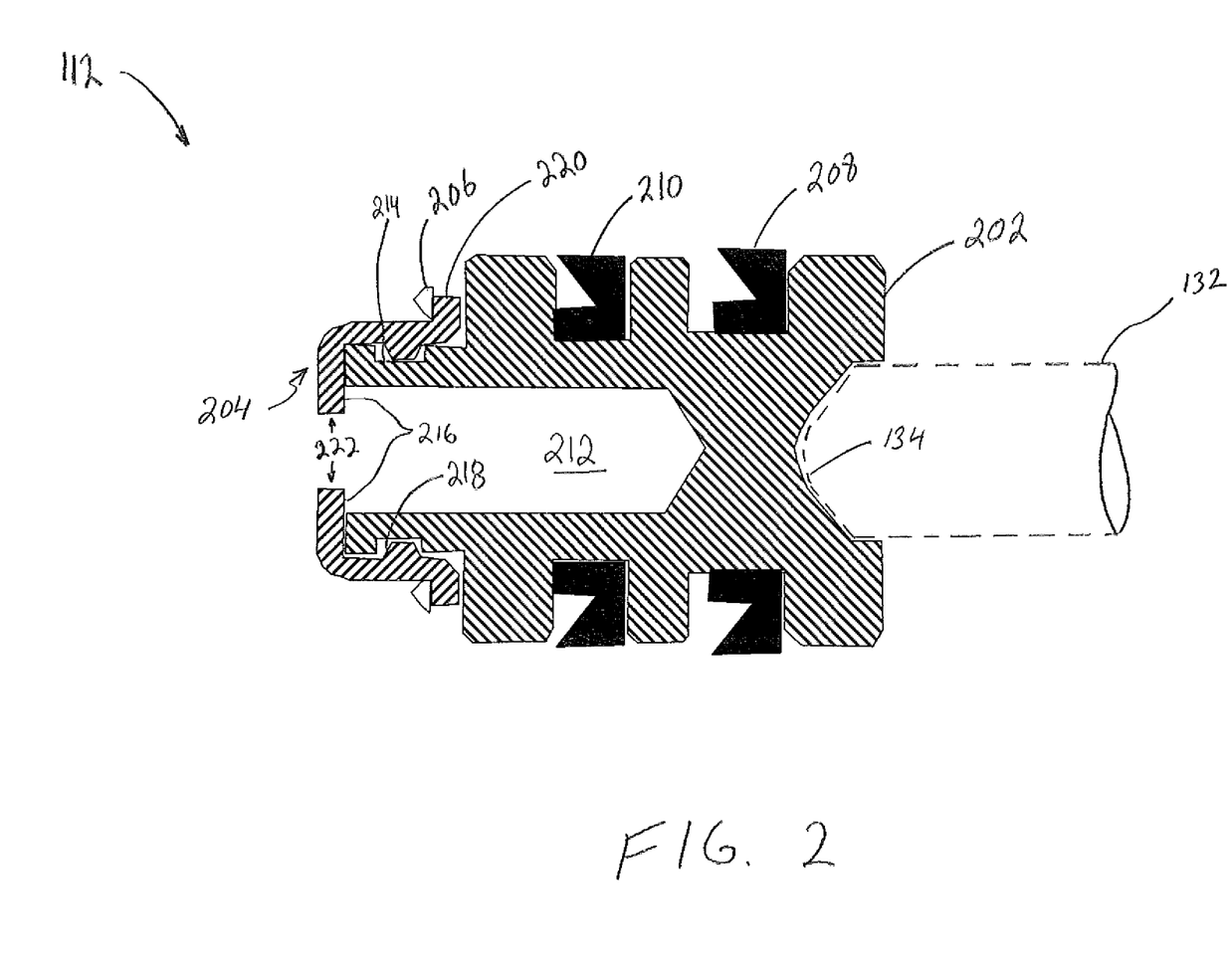
FIG. 2 depicts a cross sectional view of a first piston assembly of the master cylinder assembly, depicted in FIG. 1.

Referring to FIG. 2, a cross sectional view of the first piston assembly 112 is depicted. The first piston assembly 112 includes a first piston body 202, a first spring bracket 204, a radial boss 206, and seals 208 and 210. The first piston body 202 defines a front-facing cavity 212 and the ball-and-socket interface 134 at opposite ends thereof. The first piston body 202 couples with the first spring bracket 204 at a radial groove 214 formed at the left end of the first piston body 202. The seals 208 and 210 seal the first piston body 202 against the bore 136 of the cylinder 110 (see also FIG. 1).

The first spring bracket 204 includes an inward ring portion 216, a tab 218, and an outward ring portion 220. The outward ring portion 220 is fixedly coupled to the radial boss 206. The first spring bracket 204 is assembled about the first piston body 202 in a snap-fit manner (i.e., the tab 218 springs outward as the first spring bracket 204 is brought into contact with the first piston body 202, and then the tab 218 snaps into the radial groove 214). When assembled, the outward ring portion 220 is substantially perpendicular to the first piston body 202 in an axial direction. Similarly, the inward ring portion 216 is substantially perpendicular to the first piston body 202 in the axial direction. The inward ring portion 216 provides a termination plane for the front-facing cavity 212, and defines an opening 222.

Figure 3:
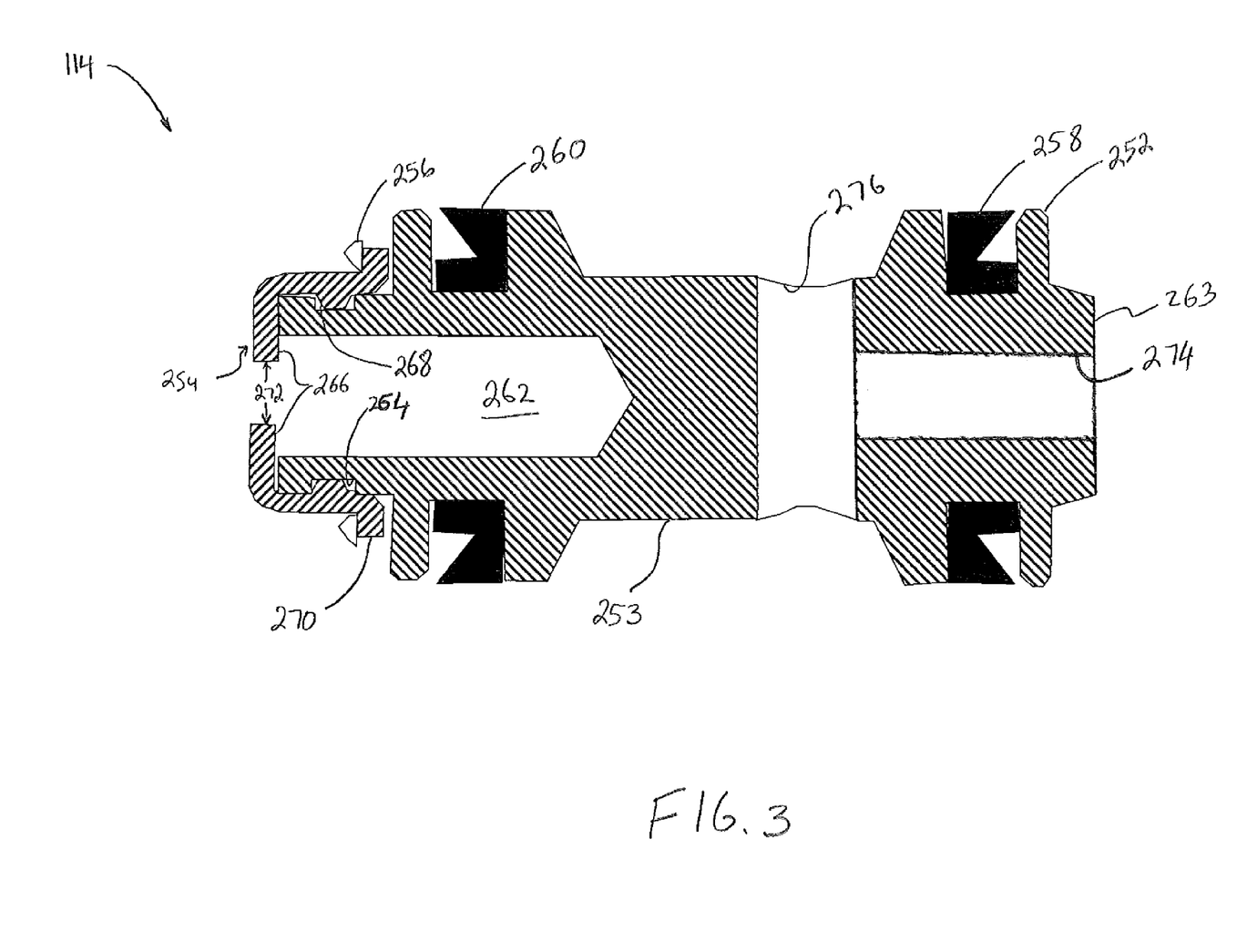
FIG. 3 depicts a cross sectional view of a second piston assembly of the master cylinder assembly, depicted in FIG. 1.

Referring to FIG. 3, a cross sectional view of the second piston assembly 114 is depicted. The second piston assembly 114 includes a rear piston body 252, a front piston body 253, a second spring bracket 254, a radial boss 256, and seals 258 and 260. The front piston body 253 defines a front-facing cavity 262, while the rear piston body 252 defines a sealing surface 263, at opposite ends of the second piston assembly 114. Also, the rear piston body 252 defines a central bore 274. A radial opening 276 is formed between the rear piston body 252 and the front piston body 253. The front piston body 253 couples with the second spring bracket 254 at a radial groove 264 formed at the left periphery of the front piston body 253. The seal 258 seals the rear piston body 252 against the bore 136, while the seal 260 seals the front piston body 253 against the bore 136 of the cylinder 110 (see also FIG. 1).

The second spring bracket 254 includes an inward ring portion 266, a tab 268, and an outward ring portion 270. The outward ring portion 270 is fixedly coupled to the radial boss 256. The second spring bracket 254 is assembled about the front piston body 253 in a snap-fit manner. When assembled, the outward ring portion 270 is substantially perpendicular to the front piston body 253 in an axial direction. Similarly, the inward ring portion 266 is substantially perpendicular to the front piston body 253 in the axial direction. The inward ring portion 266 provides a termination plane for the front-facing cavity 262, defining an opening 272.

Figure 4:
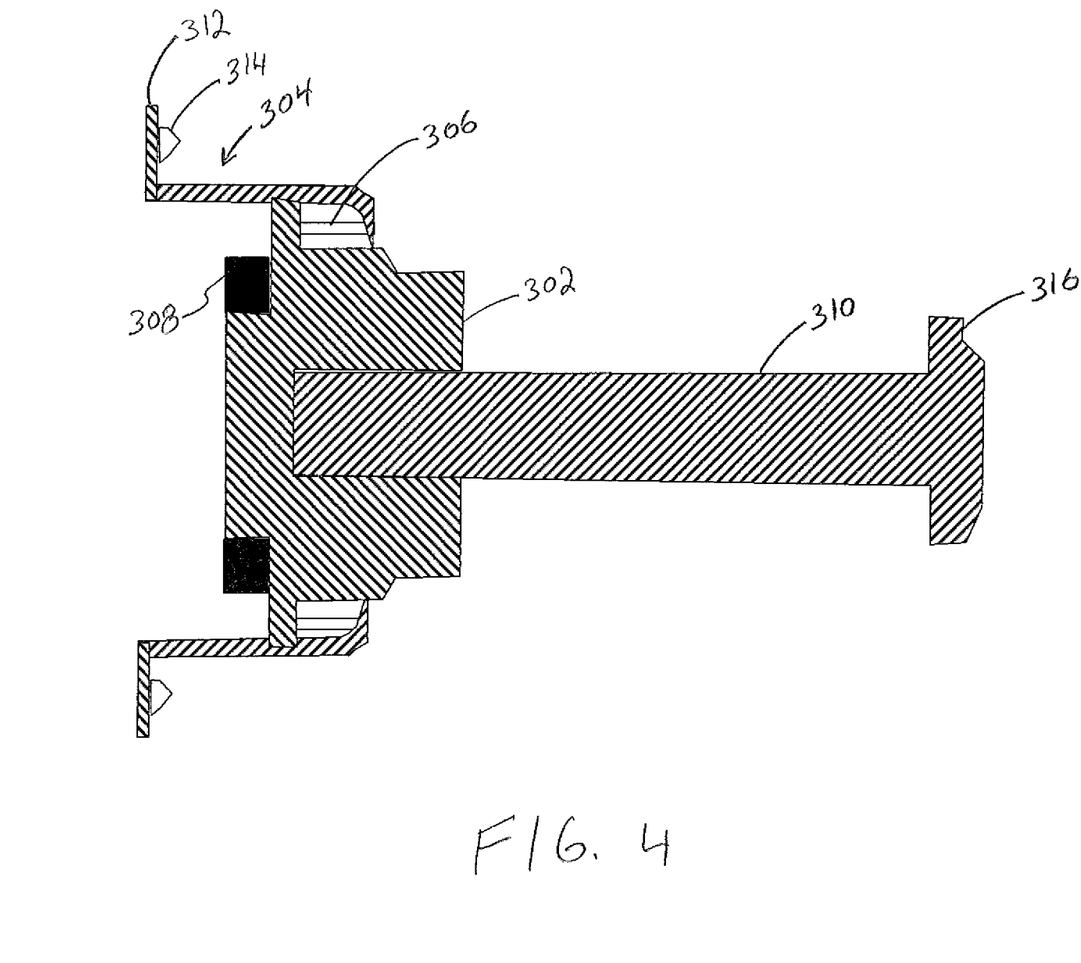
FIG. 4 depicts a cross sectional view of a poppet assembly of the master cylinder assembly, depicted in FIG. 1.

Referring to FIG. 4, a cross sectional view of the first poppet assembly 116 is depicted. While the description of FIG. 4 is directed to the first poppet assembly 116, the same description is also applicable to the second poppet assembly 118. The first poppet assembly 116 includes a poppet body 302, a poppet spring bracket 304, a poppet spring 306, a poppet seal 308, and a poppet actuation rod 310. As depicted in FIG. 1, the poppet spring bracket 304 is biased forward against the second piston assembly 114 by the first spring 120 (or in the case of the second poppet assembly 118 against the end 158 of the cylinder 110 by the second spring 122). The poppet spring bracket 304 includes an outward ring portion 312 with a radial boss 314. The radial boss 314 couples to the first spring 120. The poppet spring bracket 304 is configured to slidably interface with the poppet body 302.

The poppet spring 306 of the first poppet assembly 116 has a lower spring constant than the first spring 120. Similarly, the poppet spring 306 of the second poppet assembly 118 has a lower spring constant than the second spring 122. When the poppet spring bracket 304 is firmly held in place against the second piston assembly 114 by the first spring 120, the poppet spring 306 biases the poppet body 302 toward the sealing surface 263 of the second piston assembly 114 (or in the case of the second poppet assembly 118 toward the end 158 of the cylinder 110, see also FIGS. 1 and 3). The poppet seal 308 seals the poppet body 302 against the sealing surface 263 (or in the case of the second poppet assembly 118 against the end 158 of the cylinder 110).

The poppet body 302 is fixedly coupled to the poppet actuation rod 310. In one embodiment, the poppet actuation rod 310 is press fit inside the poppet body 302. The poppet actuation rod 310 includes a head portion 316 that is located within the front-facing cavity 262 (see FIG. 1) and interfaces with the inward ring portion 216 (or in the case of the second poppet assembly 118 with the inward ring portion 266).

The operation of the braking system 100 is described with reference to FIGS. 1, and 5-6. In operation, with the brake pedal (not shown) in the released position, the input rod 132 is in a rest position, as depicted in FIG. In FIG. 1 the first spring 120 biases the second piston assembly 114 away from the first piston assembly 112, and the second spring 122 biases the second piston assembly 114 away from the end 158 of the cylinder 110. Therefore, the first and second piston assemblies 112 and 114 are positioned in a rearward position wherein the second piston assembly 114 is spaced from the end 158 of the cylinder 110 and the first piston assembly 112 is spaced from the second piston assembly 114.

Since the poppet springs 306 bias the poppet bodies 302 leftward and since the actuation shafts 310 are fixedly coupled to the poppet bodies 302, the head potions 316 are also biased leftward. The leftward movement of the head portions 316 are, however, limited by the inward ring portions 216 and 266. As a result, the head portions 316 cause the poppet springs 306 to be compressed. The compressed states of the poppet springs 306, therefore, generate gaps between the poppet assemblies 116 and 118 and the second piston assembly 114 and the end 158 of the cylinder 110, respectively, as depicted in FIG. 1.

The gap between the first poppet assembly 116 and the second piston assembly 114 allows fluid communication between the reservoir 102 and the first pressure chamber 124 through the reservoir inlet 150, the radial opening 276, and the central bore 274 (see also FIG. 3). Similarly, the gap between the second poppet assembly 118 and the end 158 of the cylinder 110 allows fluid communication between the reservoir 102 and the second pressure chamber 126 through the reservoir inlet 152. The state of the braking system depicted in FIG. 1 may hereinafter be referred to as the "released position."

When braking is first initiated (i.e., when the operator of the vehicle applies a force to the brake pedal (not shown)), the input rod 132 travels leftward, with reference to FIG. 1. The leftward travel of the input rod 132 moves the first piston assembly 112 leftward. Depending on spring constants of the first and second springs 120 and 122, leftward travel of first piston assembly 112 causes leftward movement of the second piston assembly 114 and/or the first piston assembly 112. For example, if the spring constants of the first and second springs 120 and 122 are equal, then for every unit of leftward travel of the first piston assembly 112 the second piston assembly 114 travels leftward ½ the same unit.

With the first and second piston assemblies 112 and 114 moving leftward, the spaces between the first and second piston assemblies 112 and 114 and between the second piston assembly 114 and the end 158 of the cylinder 110 reduce, as the first and second springs 120 and 122 are partially compressed. As a result, the poppet springs 306 of the first and second poppet assemblies 116 and 118 are allowed to expand and the poppet bodies 302 seal against the second piston assembly 114 and the end 158 of the cylinder 110, respectively, as depicted in FIG. 5. Once the first poppet assembly 116 is sealed against the sealing surface 263 of the second piston assembly 114, fluid communication between the reservoir 102 and the first pressure chamber 124 through the first poppet assembly 116 is cutoff. Specifically, fluid communication through the second piston assembly 114 (i.e., through the central bore 274) and around the first poppet assembly 116 is cutoff. In addition, fluid communication between the reservoir 102 and the first pressure chamber 124 about the groove 140 is cutoff as the leftward movement of the second piston assembly 158 moves the seal 258 against the bore 136 of the cylinder 110 at the first portion 142 of the grove 140. The state of the braking system depicted in FIG. 5 may hereinafter be referred to as the "activated position."

Figure 5:
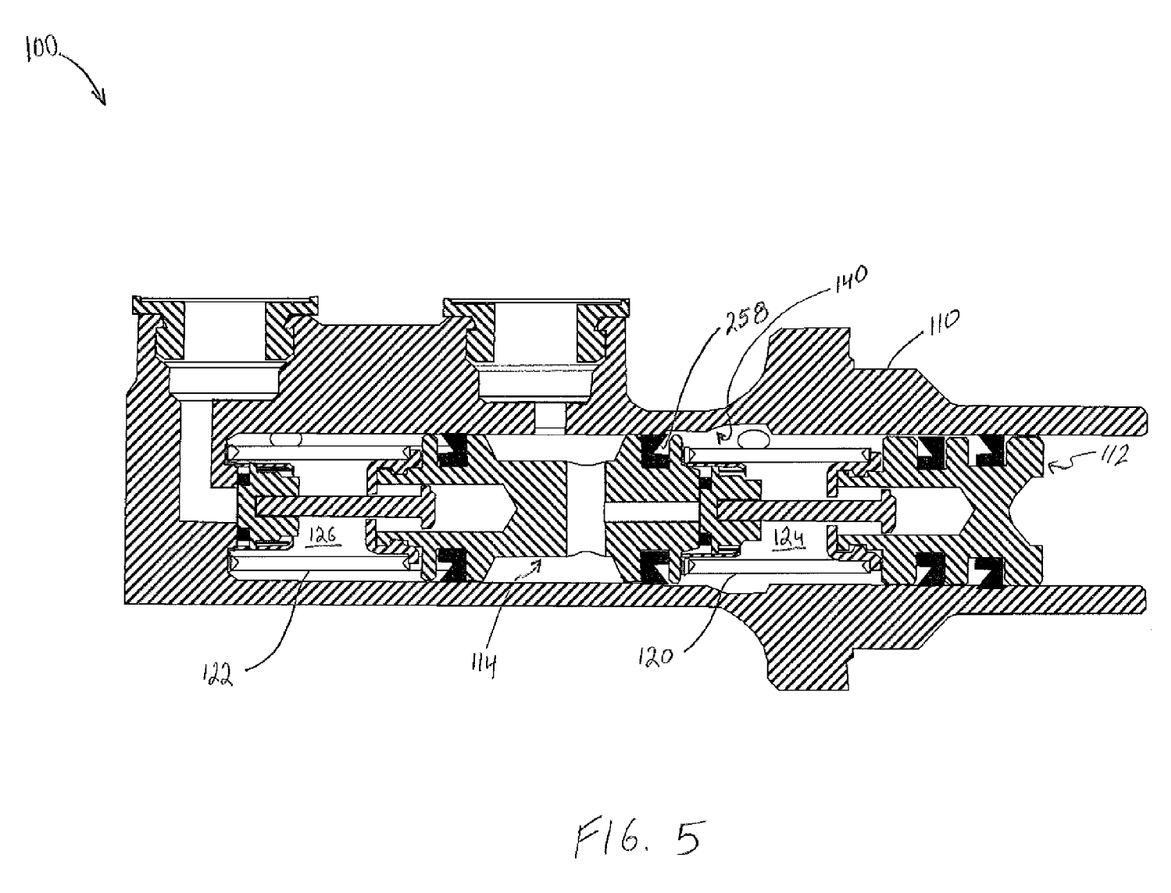
FIG. 5 depicts a fragmentary cross sectional view of the master cylinder assembly depicted in FIG. 1 in an activated position.

Once the braking system is in the condition depicted in FIG. 5, further leftward movement of the first piston assembly 112, results in further leftward movement of the second piston assembly 114. As discussed above, once the seal 258 passes by the first portion 142 of the groove 140 and the first poppet assembly 116 seals against the second piston assembly 114, the first pressure chamber 124 is isolated from fluid communication with the reservoir 102. Additional leftward movement of the first piston assembly 112 after this point results in fluid being pressurized within the first and second pressure chambers 124 and 126.

Additionally, since the poppet bodies 302 are seated against the second piston assembly 114 and the end 158 of the cylinder 110, and the actuation shafts are fixedly coupled to the poppet bodies 302, the actuation shafts 310 of the first and second poppet assemblies 116 and 118 slide within the front-facing cavities 212 and 262 of the first and second piston assemblies 112 and 114, respectively. Also, the spaces between the first and second piston assemblies 112 and 114 and between the second piston assembly 114 and the end 158 of the cylinder 110 continue to be reduced, as the first and second springs 120 and 122 continue to be compressed.

Figure 6:
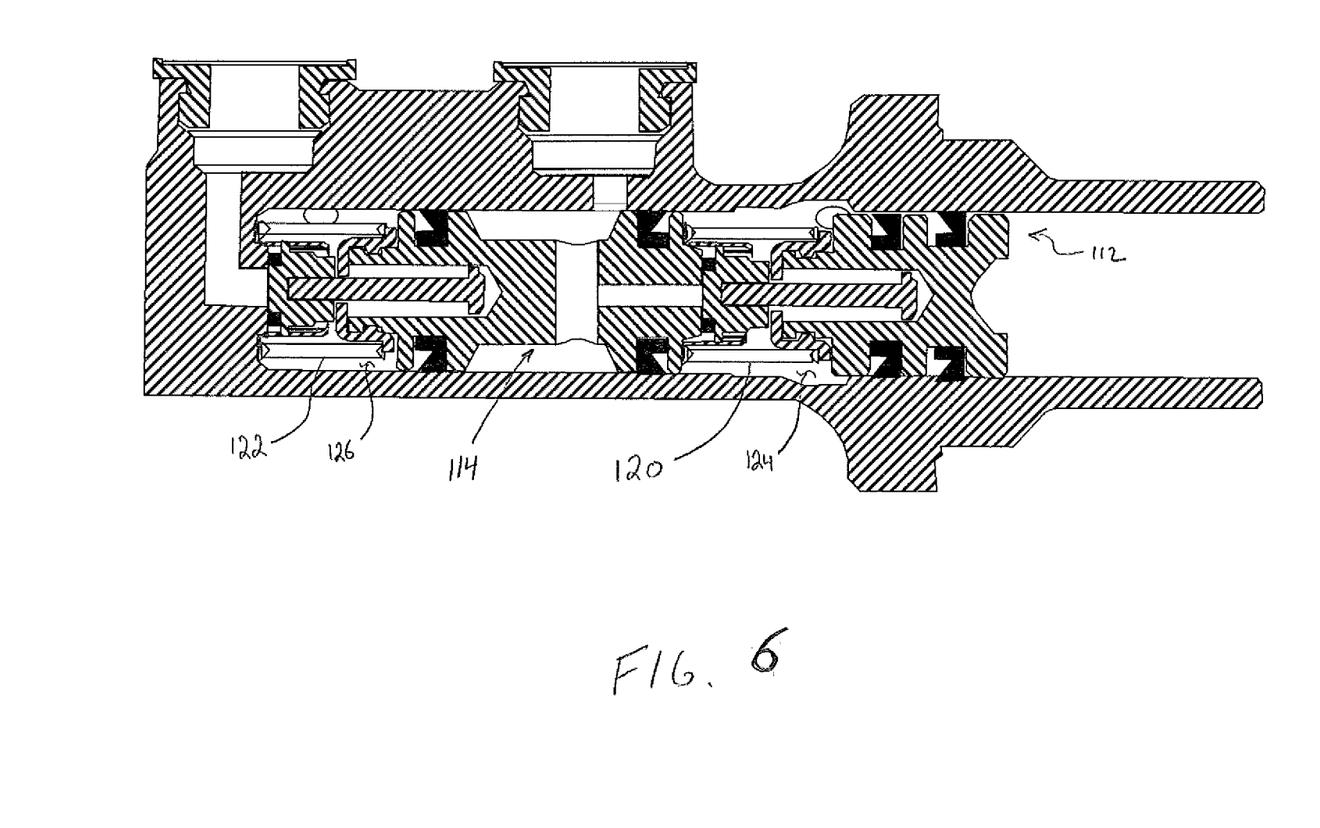
FIG. 6 depicts a fragmentary cross sectional view of the master cylinder assembly depicted in FIG. 1 in a full travel position.

Continued leftward movement from the activated position of FIG. 5 leads to a "Full Travel" state depicted in FIG. 6. In FIG. 6, the actuation shafts 310 of the first and second poppet assemblies 116 and 118 are nearly at the ends of the front-facing cavities 212 and 262, respectively. The first and second springs 120 and 122 are depicted in a nearly compressed state. Pressure within the first and second pressure chambers 124 and 126, and thereby at the first and second downstream braking circuits (not shown), are at the highest level, providing maximum braking function.

When the operator of the vehicle partially releases the brake pedal (not shown), the input rod 132 moves rightward. With the first spring 120 in nearly a fully compressed position, rightward movement of the input rod 132 allows the first piston assembly 112 to move rightward from its full travel state, depicted in FIG. 6. Similarly, with the second spring 122 in nearly a fully compressed position, rightward movement of the first piston assembly 112 allows the second piston assembly 114 to move rightward from its full travel state, depicted in FIG. 6. As a result of the rightward movements of the first and second piston assemblies 112 and 114, pressures within the first and second pressure chambers 124 and 126 decrease. Since the poppet springs 306 bias their respective poppet bodies 302 forward toward the second piston assembly 114 and the end 158 of the cylinder 110, while the actuation shafts 310 of the first and second poppet assemblies 116 and 118 move relative to the front-facing cavities 212 and 262, the poppet assemblies 116 and 118 remain sealed against the sealing surface 263 of the second piston assembly 114 and the end 158 of the cylinder 110.

The sealed relationship between the first poppet assembly 116 and the second piston assembly 114, and the second poppet assembly 118 and the end 158 of the cylinder 110, remains until the head portions 316 reach the inward ring portions 216 and 266. At this point the poppet springs 306 are allowed to be compressed since the poppet bodies 302, which are fixedly coupled to the actuation shafts 310, move rightward as the first and second piston assemblies 112 and 114 continue to travel rightward, and further since the spring constants of the first and second springs 120 and 122 are higher than the poppet springs 306. As the poppet springs 306 begin to be compressed, the seals between the first and second poppet assemblies and the second piston assembly 114 and the end 158 of the cylinder 110 break and fluid communication is reestablished between the reservoir 102 and the first and second pressure chambers 124 and 126, as depicted in FIG. 1.

Once the seals 308 of the first and second poppet assemblies 116 and 118 break from the sealing surface 263 and the end 158 of the cylinder 110, the first and second pressure chambers 124 and 126 are placed in fluid communication with the reservoir 102. At the same time, fluid is also allowed to transfer from the reservoir 102 to the first pressure chamber 124 around the seal 258 and about the groove 140. Since the first pressure chamber 124 is in fluid communication with the first downstream braking circuit (not shown) through the first outlet 128, the fluid path about the groove 140 allows for a large unimpeded fluid flow from the reservoir 102 to the first downstream circuit (not shown) to provide the desired fast-fill function.

The aforementioned flow of fluid over the seal 258 of the second piston assembly 114 and about the groove 140 eliminates the need for a check valve in order to provide the desired fast fill function. In other words, the interface between the seal 258 of the second piston assembly 114 and the groove 140 allows the first downstream braking circuit (not shown) to be filled quickly from the reservoir 102, and thereafter, as described above, isolate the first braking circuit (not shown) from the reservoir 102 in the next braking cycle, as depicted in FIG. 5. In one embodiment, a flow of about 13.9 cubic centimeters per second is provided to the first downstream braking circuit (not shown) when the braking is first initiated.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A master cylinder comprising:
   a cylinder bore;
   a first piston positioned within the cylinder bore;
   a second piston positioned within the bore and located forwardly of the first piston;
   a first pressure chamber within the cylinder bore and defined in part by a rear portion of the second piston and a forward portion of the first piston;
   a first pressure chamber seal extending radially outwardly from the rear portion of the second piston;
   a first reservoir inlet configured to provide fluid communication between a reservoir and the cylinder bore at a location forwardly of the first pressure chamber seal; and
   a first groove extending axially along the cylinder bore and positioned such that (i) when the second piston is in a released position, the first groove is located directly outwardly of the first pressure chamber seal and the reservoir is in fluid communication with the first pressure chamber through the first groove, and (ii) when the second piston is in an activated position, the first pressure chamber seal isolates the reservoir from the first pressure chamber at a location forwardly of the first groove.

2. The master cylinder of claim 1, wherein the first groove is one of a plurality of grooves, each of the plurality of grooves extending axially along the cylinder bore and positioned such that when the second piston is in the released position, each of the plurality of grooves is located directly outwardly of the first pressure chamber seal.

3. The master cylinder of claim 1, wherein the first groove extends radially completely about the cylinder bore.

4. The master cylinder of claim 1, further comprising:
   a second pressure chamber within the cylinder bore and defined in part by a forward portion of the second piston.

5. The master cylinder of claim 4, further comprising:
   a second reservoir inlet configured to provide fluid communication between the reservoir and the cylinder bore at a location forwardly of the first pressure chamber seal; and
   a second seal extending radially outwardly from the second piston, the second seal defining a rearward portion of the second pressure chamber and a forward portion of a low pressure area, the low pressure area extending between the second seal and the first pressure chamber seal.

6. The master cylinder of claim 5, further comprising:
   a release path extending between the low pressure area and a rearward face of the second piston; and
   a first poppet assembly configured to sealingly engage the rearward face of the second piston.

7. The master cylinder of claim 6, further comprising:
   a second poppet assembly configured to isolate the second pressure chamber from the reservoir.

8. A braking system comprising:
   a master cylinder including an inner wall defining a portion of a bore;
   a primary piston positioned within the bore;
   a secondary piston positioned within the bore and located forwardly of the primary piston;
   a primary pressure chamber within the bore and defined in part by a rear portion of the secondary piston and a forward portion of the primary piston;
   a secondary pressure chamber within the bore and defined in part by a forward portion of the secondary piston;
   a first seal extending radially outwardly from the second piston, the first seal isolating the secondary pressure chamber from a low pressure secondary area;
   a second seal extending radially outwardly from the second piston, the second seal positioned between the low pressure secondary area and the primary pressure chamber;
   a reservoir in fluid communication with the low pressure secondary area; and
   a first groove extending axially along the bore and positioned such that (i) when the secondary piston is in a released position, the first groove is located directly outwardly of the second seal and the reservoir is in fluid communication with the primary pressure chamber through the first groove, and (ii) when the secondary piston is in an activated position, the second seal sealingly engages the inner wall to isolate the reservoir from the primary pressure chamber.

9. The braking system of claim 8, wherein the first groove is one of a plurality of grooves, each of the plurality of grooves extending axially along the bore and positioned such that when the secondary piston is in the released position, each of the plurality of grooves is located directly outwardly of the second seal.

10. The braking system of claim 8, wherein the first groove extends radially completely about the bore.

11. The braking system of claim 8, wherein the reservoir is in fluid communication with a secondary pressure chamber inlet.

12. The braking system of claim 11, further comprising:
   a release path extending between the low pressure secondary area and a rearward face of the secondary piston; and a first poppet assembly configured to sealingly engage the rearward face of the secondary piston.

13. The braking system of claim of claim 12, further comprising:

a second poppet assembly configured to isolate the secondary pressure chamber from the reservoir.

* * * * *